(12) United States Patent
Yoshimura et al.

(10) Patent No.: US 8,257,212 B2
(45) Date of Patent: Sep. 4, 2012

(54) CHAIN TENSIONER

(75) Inventors: Toshimitsu Yoshimura, Ishikawa (JP); Hitoshi Hamano, Ishikawa (JP); Yoshio Kurokawa, Ishikawa (JP); Hideaki Seki, Ishikawa (JP)

(73) Assignee: Daido Kogyo Co., Ltd., Ishikawa (JP)

( * ) Notice: Subject to any disclaimer, the term of this patent is extended or adjusted under 35 U.S.C. 154(b) by 349 days.

(21) Appl. No.: 12/521,836

(22) PCT Filed: Jan. 19, 2007

(86) PCT No.: PCT/JP2007/050754
§ 371 (c)(1),
(2), (4) Date: Jun. 30, 2009

(87) PCT Pub. No.: WO2008/087733
PCT Pub. Date: Jul. 24, 2008

(65) Prior Publication Data
US 2010/0016105 A1    Jan. 21, 2010

(51) Int. Cl.
*F16H 7/22* (2006.01)
*F16H 7/08* (2006.01)
(52) U.S. Cl. .......... 474/110; 474/101; 474/109
(58) Field of Classification Search ............ 474/101, 474/109, 110, 111
See application file for complete search history.

(56) References Cited

U.S. PATENT DOCUMENTS

| | | | | |
|---|---|---|---|---|
| 5,601,505 A | * | 2/1997 | Tada | 474/110 |
| 5,931,754 A | * | 8/1999 | Stief et al. | 474/109 |
| 6,817,958 B2 | * | 11/2004 | Kaido et al. | 474/101 |
| 6,916,264 B2 | * | 7/2005 | Hashimoto et al. | 474/109 |
| 7,063,634 B2 | * | 6/2006 | Hashimoto et al. | 474/110 |
| 2003/0139235 A1 | * | 7/2003 | Yamamoto et al. | 474/109 |
| 2004/0266571 A1 | * | 12/2004 | Izutsu et al. | 474/110 |
| 2005/0049093 A1 | * | 3/2005 | Sato et al. | 474/101 |
| 2006/0003859 A1 | * | 1/2006 | Sato et al. | 474/110 |
| 2008/0280711 A1 | | 11/2008 | Sato et al. | |
| 2008/0280712 A1 | * | 11/2008 | Ryouno et al. | 474/110 |

FOREIGN PATENT DOCUMENTS

| | | |
|---|---|---|
| CN | 1886606 A | 12/2006 |
| JP | 08-145130 A | 6/1996 |
| JP | 08-184353 A | 7/1996 |
| JP | 2002-5250 A | 1/2002 |
| JP | 2005-042860 A | 2/2005 |
| JP | 2005-344872 | 12/2005 |

* cited by examiner

*Primary Examiner* — Michael Mansen
*Assistant Examiner* — Henry Liu
(74) *Attorney, Agent, or Firm* — Arent Fox LLP

(57) ABSTRACT

A chain tensioner has a plunger (14) slidably fitted in a bottomed cylinder (12) formed in a housing (11), and configured to resiliently urge the plunger (14) by a return spring (13) in the direction along which the plunger (14) is projected out from the cylinder (12), wherein the chain tensioner is configured to attach an engagement clip (19) to the opening of the cylinder (12), and to provide an engagement portion engageable with the engagement clip (19) to the end of the plunger (14) on the projection side thereof, so as to allow the engagement clip (19) and the engagement portion to engage with and disengage from each other corresponding to the position of rotation of the plunger (14).

6 Claims, 13 Drawing Sheets

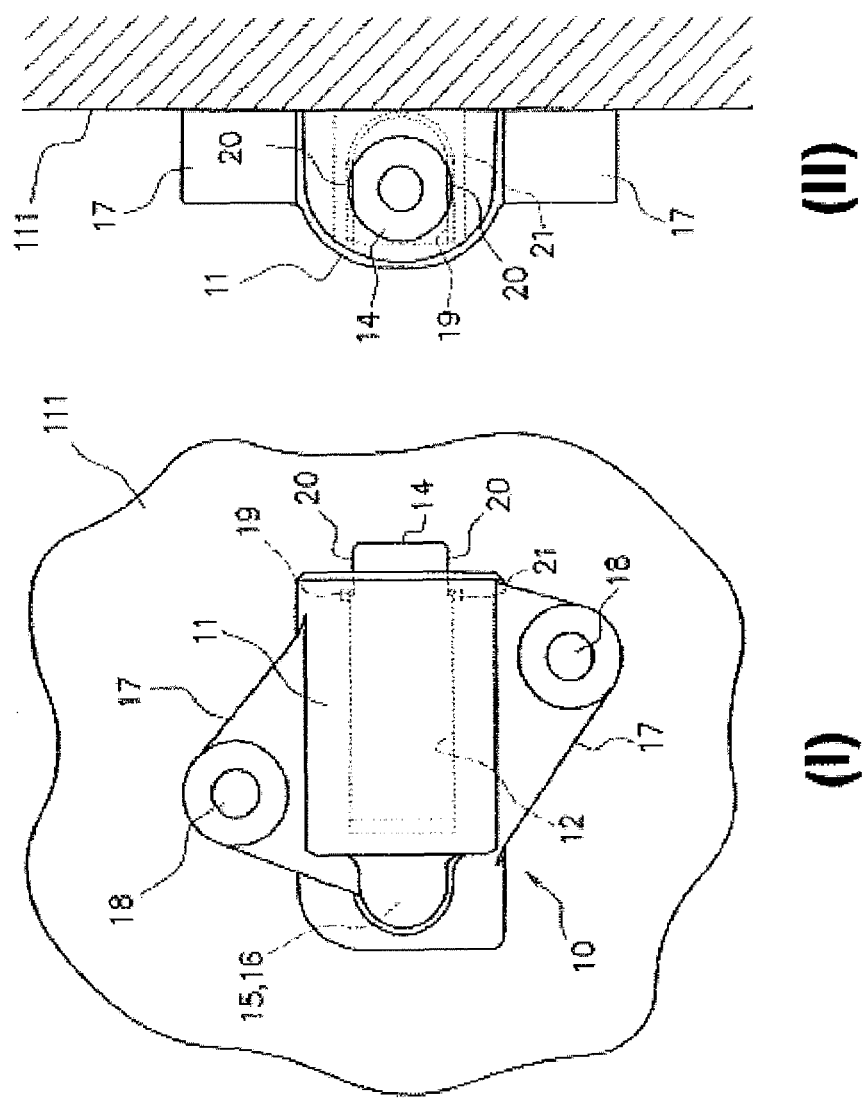

PERSPECTIVE VIEW IN THE
DIRECTION OF ARROW B

FIG. 8A (I) 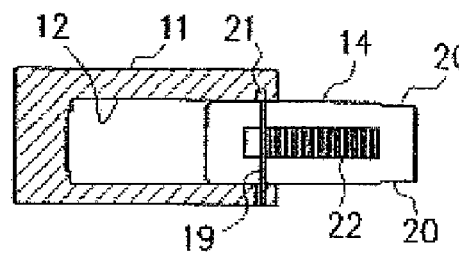 (II) 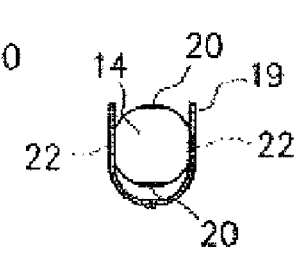
FIG. 8B (I) 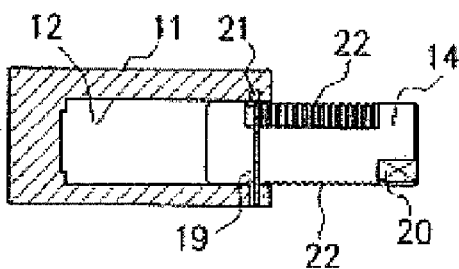 (II) 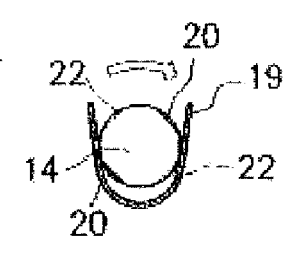
FIG. 8C (I) 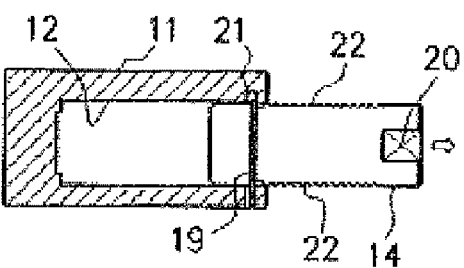 (II) 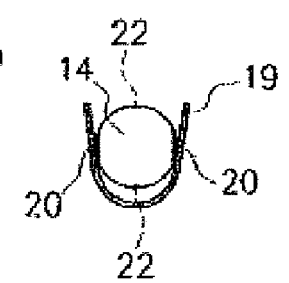
FIG. 8D (I) 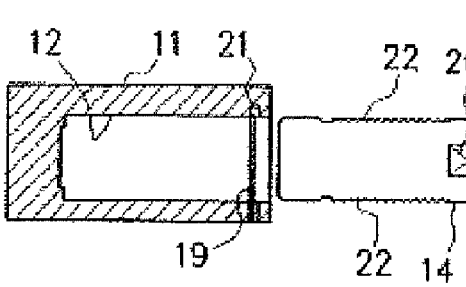 (II) 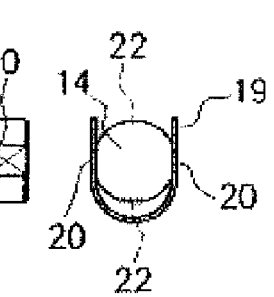

FIG. 9A
(I) 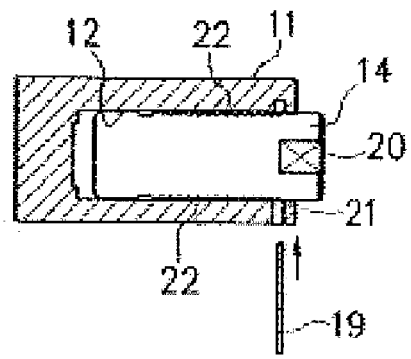
(II) 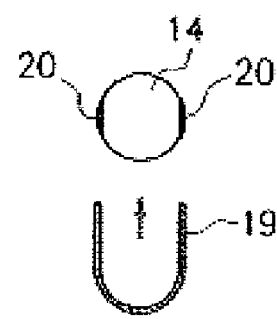
FIG. 9B
(I) 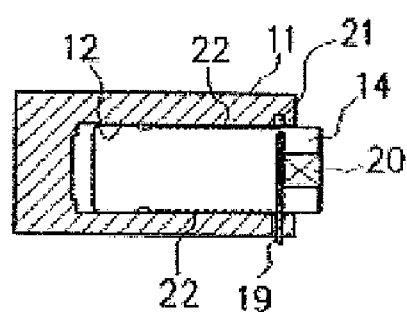
(II) 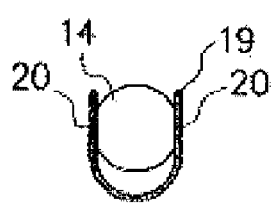
FIG. 9C
(I) 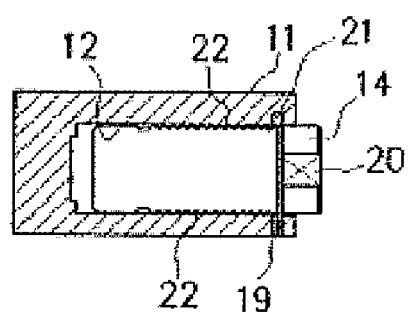
(II) 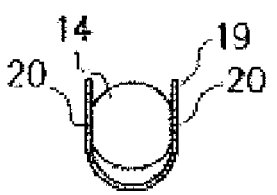

CHAIN TENSIONER

CROSS-REFERENCE TO RELATED APPLICATION

This application is a National Stage entry of International Application No. PCT/JP2007/050754, filed Jan. 19, 2007, the disclosure of the prior application is hereby incorporated in its entirety by reference.

TECHNICAL FIELD

The present invention relates to a chain tensioner used for internal combustion engines or the like, aimed at preventing slacking of a transmission chain.

BACKGROUND ART

In internal combustion engines, particularly in four-cycle engines or the like for example, a transmission mechanism for transmitting rotation of a crankshaft to camshafts is configured to provide a chain tensioner on the slacking side of a chain, so as to exert a regulative force of the chain tensioner to a chain, to thereby keep the tensile force of the chain at a constant level.

A general chain tensioner is configured to have a spring and a plunger assembled in a cylinder formed in a housing. When the chain slacks, the chain tensioner operates to allow the plunger, urged by the spring, to pressurize the chain so as to keep an appropriate tension, whereas when the chain produces tension as large as pressurizing the plunger, the chain tensioner operates so as to buffer regression of the plunger, with the aid of hydraulic pressure of a hydraulic oil filled behind the plunger.

This sort of chain tensioner, configured to urge the plunger using the spring, needs a mechanism for preventing projection of the plunger during the rest time typically in the process of delivery. Known exemplary mechanisms of suppressing the plunger having conventionally been adopted in general, include a mechanism of preventing projection of the plunger, by providing through-holes to the plunger and the housing, and setting a pin by inserting it through the individual through-holes so as to prevent projection of the plunger; and a mechanism of providing an engagement groove to the plunger, and engaging a projection preventive plate attached while being mediated by a pin with the engagement groove, so as to prevent projection of the plunger (see Patent Document 1, for example).

[Patent Document 1]
Japanese Patent Application Laid-Open No. 2005-344872

The conventional mechanisms for preventing projection of the plunger, however, needs a large number of components, and needs also spaces allowing piercing or grooving of the plunger, raising obstacles to downsizing of the chain tensioner. As for the chain tensioners using the pin as described in the above, those once detached from an engine typically for maintenance will necessarily be attached by re-setting the pin so as to prevent the plunger from projecting, and are therefore not understood that they are ready to handle.

The present invention was conceived after considering the above-described situation, wherein an object of which is to provide a chain tensioner having a compact and simple structure, and excellent in the handlability.

SUMMARY OF THE INVENTION

According to the present invention, there is provided a chain tensioner having a plunger slidably fitted in a bottomed cylinder formed in a housing, and configured to resiliently urge the plunger by a spring in the direction along which the plunger is projected out from the cylinder, the chain tensioner is configured to attach an engagement clip to the opening of the cylinder, and to provide an engagement portion engageable with the engagement clip to the end of the plunger on the projection side thereof, so as to allow the engagement clip and the engagement portion to engage with and disengage from each other corresponding to the position of rotation of the plunger.

In the above-described chain tensioner, the engagement portion is formed by notching a portion of the outer circumferential surface of the plunger, so as to allow the engagement clip to engage with the notched surface thereof, to thereby allow the plunger to rotate.

In the above-described chain tensioner, the cylinder has an attachment groove for the engagement clip at the opening thereof, and the engagement clip is housed in the attachment groove in an expandable and shrinkable manner.

In the above-described chain tensioner, the plunger has a ratchet formed on the outer circumferential surface thereof in the longitudinal direction, so as to allow the engagement clip, released from the engagement portion as the plunger rotates, to engage with the ratchet.

In the above-described chain tensioner, the engagement portion has a pair of the notched surfaces at positions opposed in the direction of diameter of the plunger.

In the above-described chain tensioner, when the engagement clip and the ratchet come into engagement, the engagement clip is widened by a ratchet ridge of the ratchet so as to allow the plunger to project, and is engaged with a ratchet groove of the ratchet so as to limit regression of the plunger.

In the above-described chain tensioner, the ratchet is formed to the plunger over a portion in the outer circumferential direction thereof, and is arranged so as to bring the engagement portion of the plunger and the ratchet apart from, or to partially overlap with each other, in the outer circumferential direction of the plunger.

The above-described chain tensioner further has a limiting unit limiting rotational motion of the plunger, provided in the vicinity of the end of the plunger on the projection side thereof, and configured to limit rotation of the plunger and to allow the housing to rotate.

According to the present invention, there is provided also a chain tensioner having a plunger slidably fitted in a bottomed cylinder formed in a housing, and configured to resiliently urge the plunger by a spring in the direction along which the plunger is projected out from the cylinder, the chain tensioner is configured to attach an engagement clip to the opening of the cylinder, and to have a ratchet formed on the outer circumferential surface of the plunger in the longitudinal direction thereof, so as to allow the engagement clip to engage with the ratchet.

According to the chain tensioner of the present invention described in the above, the engagement clip and the engagement portion may engage with, or disengage from each other, corresponding to the position of rotation of the plunger. In the process of delivery for example, the engagement clip and the engagement portion are engaged with each other. The plunger in this state is urged in the direction of projection thereof by resiliency of the spring, but is kept locked in the compressed state while being engaged with the engagement clip, so as to be prevented from accidentally projecting out from the cylinder.

The chain tensioner may be brought into an operable state by rotating the plunger, so as to unlock the compressed state of the plunger caused by the engagement clip. As has been described in the above, the plunger may appropriately be locked or unlocked only by a simple rotational operation.

BRIEF DESCRIPTION OF THE DRAWINGS

FIG. 2 illustrates a top and a front elevation of the chain tensioner according to the embodiment of the present invention.

FIG. 8A is a drawing illustrating a process of disassembling the chain tensioner according to the embodiment of the present invention.

FIG. 8B is a drawing illustrating a process of disassembling the chain tensioner according to the embodiment of the present invention.

FIG. 8C is a drawing illustrating a process of disassembling the chain tensioner according to the embodiment of the present invention.

FIG. 8D is a drawing illustrating a process of disassembling the chain tensioner according to the embodiment of the present invention.

FIG. 9A is a drawing illustrating a process of assembling the chain tensioner according to the embodiment of the present invention.

FIG. 9B is a drawing illustrating a process of assembling the chain tensioner according to the embodiment of the present invention.

FIG. 9C is a drawing illustrating a process of assembling the chain tensioner according to the embodiment of the present invention.

DETAILED DESCRIPTION OF THE PREFERRED EMBODIMENTS

Preferred embodiments of the chain tensioner according to the present invention will be explained below, referring to the attached drawings.

Figure 1:
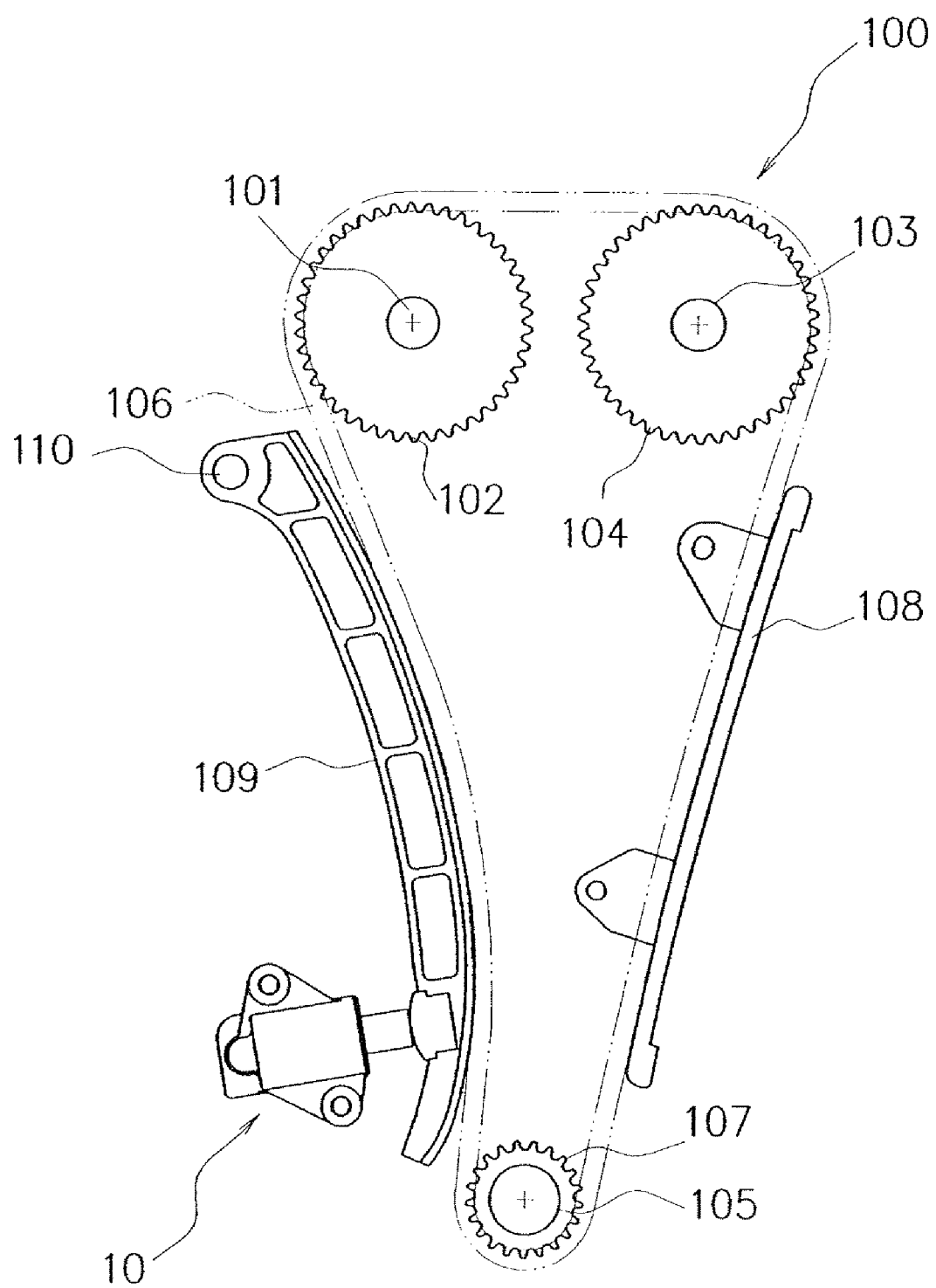
FIG. 1 is a drawing illustrating an exemplary application of a chain tensioner according to one embodiment of the present invention.

First, FIG. 1 illustrates an applied example of a chain tensioner 10 according to one embodiment of the present invention. As one example, the chain tensioner 10 is used for a cam drive system in a 4-cycle engine 100. In the drawing, a chain 106 is wrapped around a sprocket 102 of an intake-side camshaft 101, a sprocket 104 of an exhaust-side camshaft 103, and a sprocket 107 of a crankshaft 105. The chain 106 travels while being guided by a chain guide 108, and is applied with tensile force by the chain tensioner 10 while being mediated by a tensioner lever 109.

The tensioner lever 109 is supported on the base end side by a pivot 110 in a swingable manner, and coupled with the chain tensioner 10 on the tip side. When the chain 106 slacks, it operates so as to press the chain 106, with the aid of a plunger urged by a return spring as described later, to thereby keep an appropriate tensile force.

FIG. 2 and FIG. 3A to 3C in the next illustrate an exemplary configuration of the chain tensioner 10 of this embodiment. In short, the return spring 13 and the plunger 14 are assembled in a cylinder 12 of a housing 11, wherein the plunger 14 urged by the return spring 13 in the direction of projection so as to exert a regulative force on the chain 106.

The housing 11 illustrated in the drawings is made of an aluminum die cast or the like, and has the bottomed cylinder 12 bored therein. In the cylinder 12, the plunger 14 is assembled together with the return spring 13 in a slidable manner. The housing 11 has also a hydraulic chamber 15, which communicates with the cylinder 12, formed therein (see FIG. 3A), wherein a hydraulic oil flown from a check valve 16, described later, is retained in the hydraulic chamber 15.

In addition, in this embodiment, the housing 11 has brackets 17 so as to be projected out from both sides thereof, and each bracket 17 has a through-hole 18, through which a fixation bolt (not illustrated) is inserted, formed therein. The chain tensioner 10 is attached to a predetermined position of a cylinder block 111 of an engine 100, by tightening the fixation bolts.

The check valve 16 contains a valve sheet 16a having an oil gate which communicates the hydraulic chamber 15 with the external, a ball 16b disposed over the valve sheet 16a, and a stopper 16c limiting projection of the ball 16b. The check valve 16 is aimed at regulating the hydraulic oil flowing into the hydraulic chamber 15, and is configured to bring the ball 16b apart from the check sheet 16a and to allow the hydraulic oil to flow therethrough, when the chain 106 slacks and the plunger 14 consequently projects. When the plunger 14 is applied with a force in the direction of compression, the ball 16b closes the oil gate of the valve sheet 16a so as to inhibit back-flow of the hydraulic oil into the hydraulic chamber 15, and to retain the hydraulic oil therein.

In the present invention, an engagement clip 19 is attached to the opening of the cylinder 12, and an engagement portion engageable with the engagement clip 19 is provided to the end of the plunger 14 on the projection side thereof. Accordingly, the engagement clip 19 and the engagement portion are allowed to engage with and disengage from each other, corresponding to the position of rotation of the plunger 14.

The engagement portion described in the above may be configured typically by notching a portion of the outer circumferential surface of the plunger 14, so as to allow the engagement clip 19 to engage on the notched surface thereof, to thereby allow the plunger 14 to rotate. More specifically, it has so-called, width-across-flats portions (or cut surfaces for forming width-across-flats portions) 20, as a pair of notched surfaces formed at positions opposed in the direction of diameter of the plunger 14.

Figure 3A:
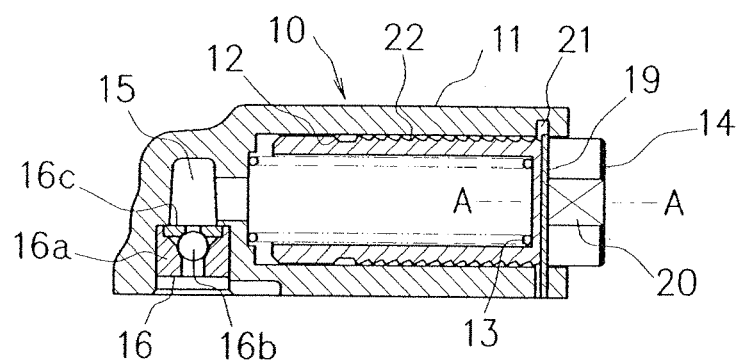
FIG. 3A is a sectional view of the chain tensioner according to the embodiment of the present invention.
Figure 3B:
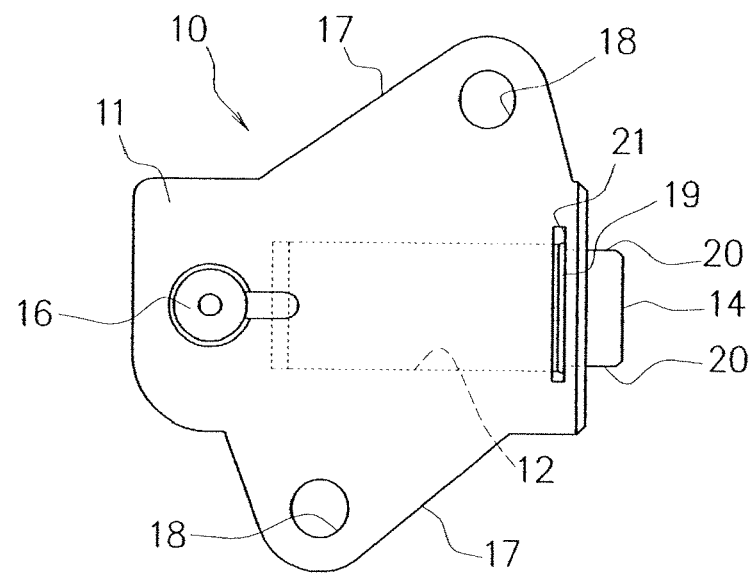
FIG. 3B is a bottom view of a portion around the projection end of a plunger of the chain tensioner according to the embodiment of the present invention.
Figure 3C:
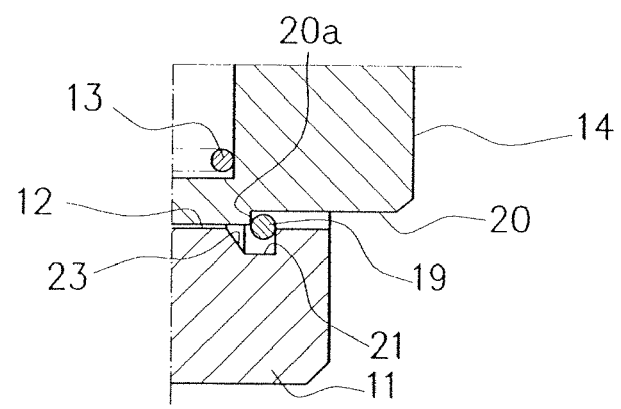
FIG. 3C is a sectional view taken along line A-A in FIG. 3A.

The width-across-flats portions 20 are parallel portions formed by cutting the end of the plunger 14, and this way of cutting produces steps 20a at the rear ends thereof, fallen from the outer circumferential surface of the plunger 14, as illustrated in FIG. 3C. Although the size (height or depth) of each step 20a is determined by the size of the cut surface of each width-across-flats portion 20, provision of at least steps 20a anyway allows them to engage with the engagement clip 19 described later, and engagement of the both limits the projecting portion of the plunger 14.

The cylinder 12 has also an attachment groove 21 for the engagement clip 19 at the opening thereof, wherein the engagement clip 19 is housed in the attachment groove 21 in an expandable and shrinkable manner. The attachment groove 21 is appropriately spaced from the engagement clip 19 so as to allow the engagement clip 19 can deform therein in an expandable and shrinkable manner, or so as to ensure at least a margin for such deformation. The attachment groove 21 opens at the lower surface of the housing 11 as illustrated in FIG. 3B, and is configured to be tightly closed by the attachment surface of the cylinder block 111 of the engine 100, when the chain tensioner 10 is attached to the cylinder block 111.

The engagement clip 19 herein is typically composed of a steel wire material having a circular section in a nearly U-shape, and has a predetermined stiffness and elasticity. The engagement clip 19 is attached so as to allow the straight portions of its U-shaped body to resiliently contact with the width-across-flats portions 20 of the plunger 14. In an exemplary case illustrated in the drawing, the engagement clip 19 is attached so as to make the bottom portion of its U-shaped body positioned on the attachment surface side of the cylinder block 111.

Note that, besides the U-shape, the geometry of the engagement clip 19 may be angular U-shape, V-shape, or other intermediate polygonal shapes. The U-shape allows the engagement clip 19 to deform at the open end side thereof in a widening and narrowing manner, and thereby the internal width thereof, corresponded to the width-across-flats portions 20, is made variable in a widening and narrowing manner as described in the above.

The plunger 14 has also ratchets 22 successively formed on a portion of the outer circumferential surface of the plunger 14 in the longitudinal direction thereof, so as to allow the engagement clip 19 and the ratchets 22 to engage with, or disengage from each other, corresponding to the position of rotation of the plunger 14.

In this configuration, the engagement portions (width-across-flats portions 20) of the plunger 14 and the ratchets 22 are positioned so as to avoid overlapping therebetween, in the outer circumferential direction of the plunger 14. In this embodiment, two series (or two rows) of ratchets 22 are provided to the plunger 14 at the portions thereof shifted approximately 90° away from the width-across-flats portions 20 in the circumferential direction. The amount (angle) of shifting may be any appropriate angle smaller than 90°.

Figure 6:
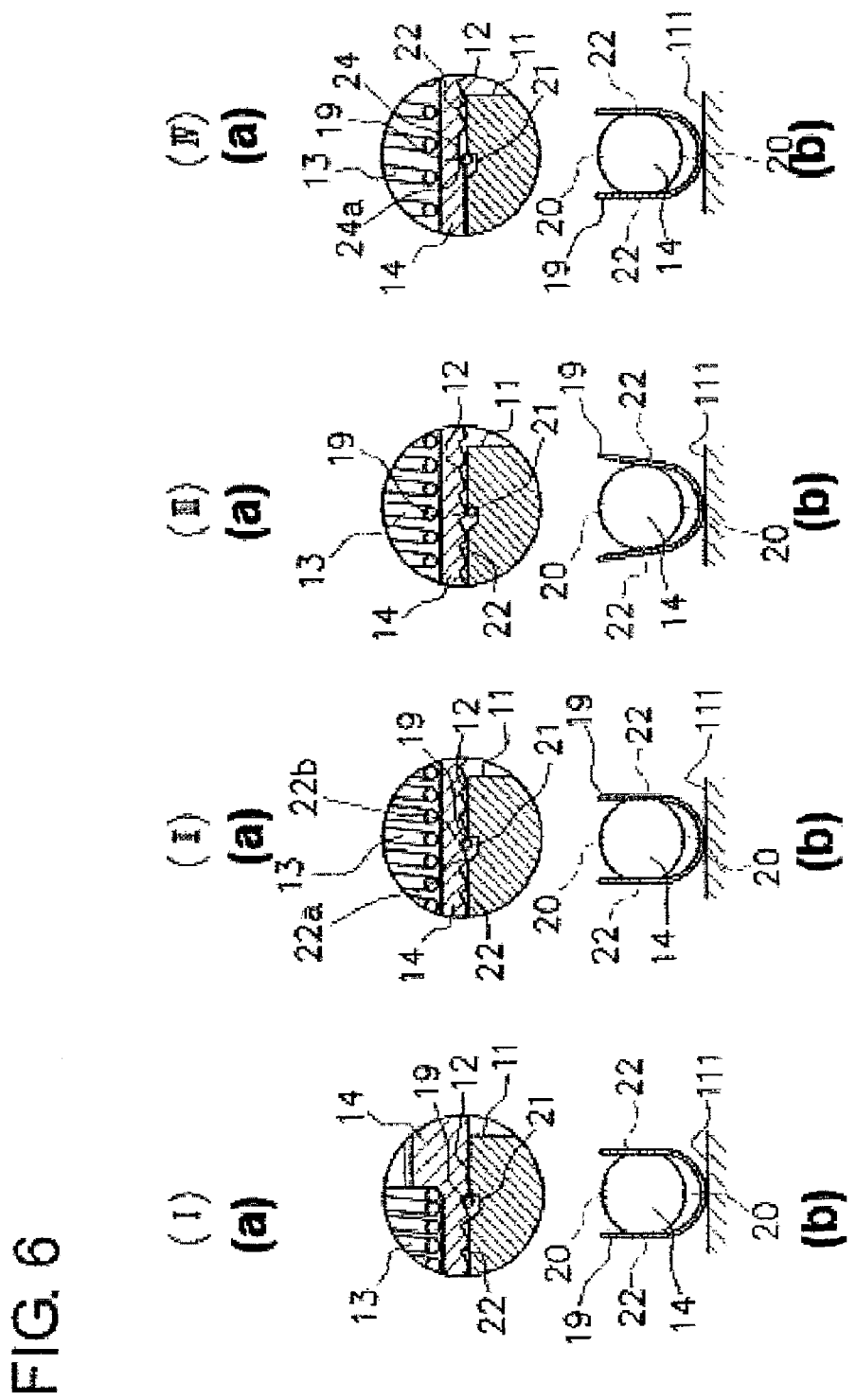
FIG. 6 is a drawing illustrating processes of projective operations of the plunger of the chain tensioner according to the embodiment of the present invention, referring to operational states I to IV of the internal structure.

Referring now to FIG. 6, each ratchet 22 has ratchet ridges 22a having an outer diameter nearly equal to the inner diameter of the cylinder 12, and ratchet grooves 22b formed between every adjacent ratchet ridges 22a. Each ratchet groove 22b is formed in to have a valley form or a modified V-shape, wherein the tapered surface on the rear side thereof (on the left side in FIG. 6) has an angle of inclination smaller than that of the engagement surface on the front side (on the right side in FIG. 6, or on the side of direction of projection). On the other hand, on the inner circumferential surface of the cylinder 12, there is formed a stopper surface 23 (see FIG. 3C) at an angle opposed to the engagement surface of the ratchet groove 22b, while being continued from the attachment groove 21.

In a state of allowing the plunger 14 to move towards the direction of projection, the engagement clip 19 successively climbs over the ratchet ridges 22a of the ratchets 22, while being widened by the ratchet ridges 22a as described later, and thereby the plunger 14 stepwisely moves. On the other hand, in the direction of regression of the plunger 14, the engagement clip 19 is held between the stopper surface 23 and the above-described engagement surface of the ratchet groove 22b, so as to limit the regressive motion of the plunger 14. In short, when the engagement clip 19 and the ratchets 22 are engaged, the plunger 14 is made movable in the direction of projection, but not movable in the regressive direction.

Each ratchet 22 has a stopper groove 24 formed at the rear endmost portion thereof. The side face (or the end face) 24a of the stopper groove 24 formed on the rear side thereof is given as a wall nearly vertical to the axial direction of the plunger 14. Accordingly, when the engagement clip 19 reaches the side face 24a (state IV in FIG. 6), the engagement clip 19 is held between the side face 24a and the attachment groove 21, and thereby the plunger 14 may be prevented from slipping off.

Major operations of the chain tensioner 10 of the present invention as configured in the above will be explained.

First, the plunger 14 typically in the process of delivery is held while being compressed in the cylinder 12 as illustrated typically in FIG. 1 to FIG. 3A. In this state, the plunger 14 is held at a position where the width-across-flats portions 20 thereof correspond to the straight portions of the engagement clip 19, so as to engage the engagement clip 19 with the width-across-flats portions 20, in particular with the steps 20a, as illustrated in FIG. 3C. The plunger 14 in this state is urged towards the direction of projection with the aid of resilient force of the return spring 13, while being locked in a compressed manner through engagement with the engagement clip 19, and is thereby prevented from accidentally projecting out from the cylinder 12. The chain tensioner 10 may therefore be kept compact, and appropriately be kept in this state in the process of delivery.

Next, the compressed state of the plunger 14 with the aid of the engagement clip 19 is unlocked, in order to turn the chain tensioner 10 operable and to make it practically usable. The operation may be carried out while keeping the chain tensioner 10 attached to the cylinder block 111 of the engine 100, wherein the width-across-flats portions 20 of the plunger 14 are nipped and rotated using a hand tool (spanner or the like).

Figure 4A:
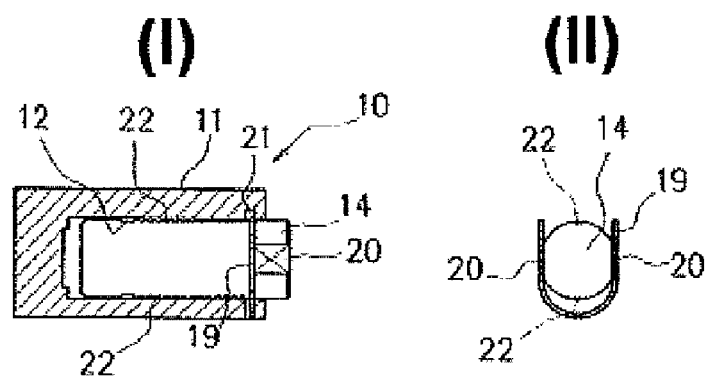
FIG. 4A is a drawing illustrating a process of unlocking the plunger of the chain tensioner according to the embodiment of the present invention.
Figure 4B:
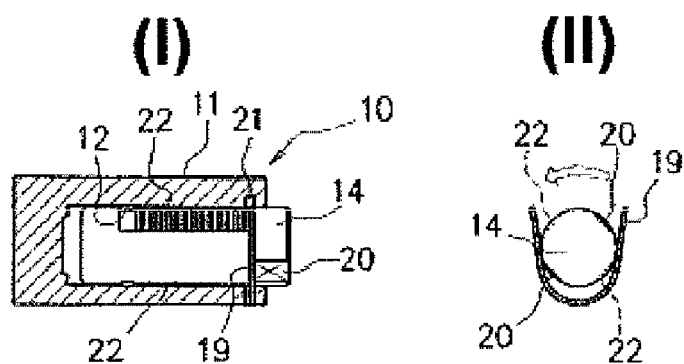
FIG. 4B is a drawing illustrating a process of unlocking the plunger of the chain tensioner according to the embodiment of the present invention.
Figure 4C:
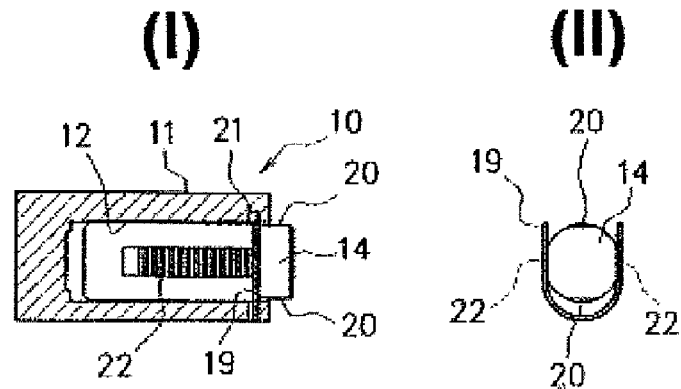
FIG. 4C is a drawing illustrating a process of unlocking the plunger of the chain tensioner according to the embodiment of the present invention.

FIG. 4A to 4C sequentially illustrate processes of unlocking the plunger 14. As illustrated in FIG. 4A, the width-across-flats portions 20 of the plunger 14 are initially projected out from the cylinder 12 as described in the above. When the plunger 14 is rotated in this state, the engagement clip 19 gradually escapes from the width-across-flats portions 20, and climbs up onto the outer circumferential surface of the plunger 14 having a diameter larger than that of the width-across-flats portions 20. Accordingly, the engagement clip 19 is widened as illustrated in FIG. 4B.

As the plunger 14 rotates, the engagement clip 19 escapes from the width-across-flats portions 20 and, on the other hand, the ratchets 22 engages with the straight portions of the engagement clip 19. In this example, the engagement clip 19 completely escapes from the width-across-flats portions 20 when the plunger 14 rotates by approximately 90°, as illustrated in FIG. 4C, and at the same time engages with the ratchet grooves 22b of the ratchets 22. In this way, the engagement clip 19 having been widened again recovers the original width, and thereby the plunger 14 is completely unlocked.

Figure 5A:
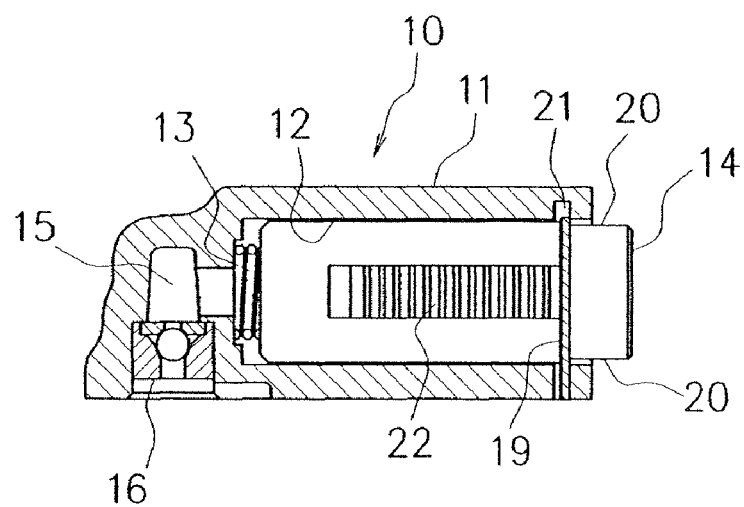
FIG. 5A is a drawing illustrating an unlocked state of a compressed plunger of the chain tensioner according to the embodiment of the present invention.
Figure 5B:
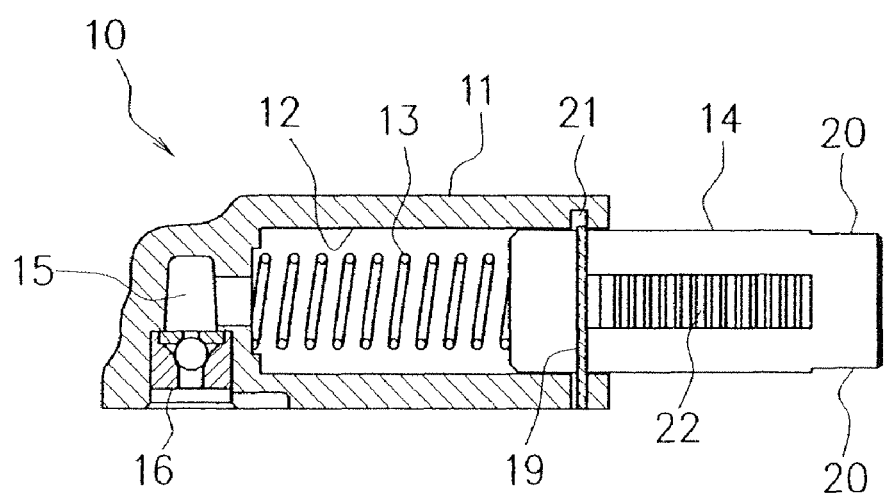
FIG. 5B is a drawing illustrating a state of maximum projection of the plunger of the chain tensioner according to the embodiment of the present invention.
Figure 7:
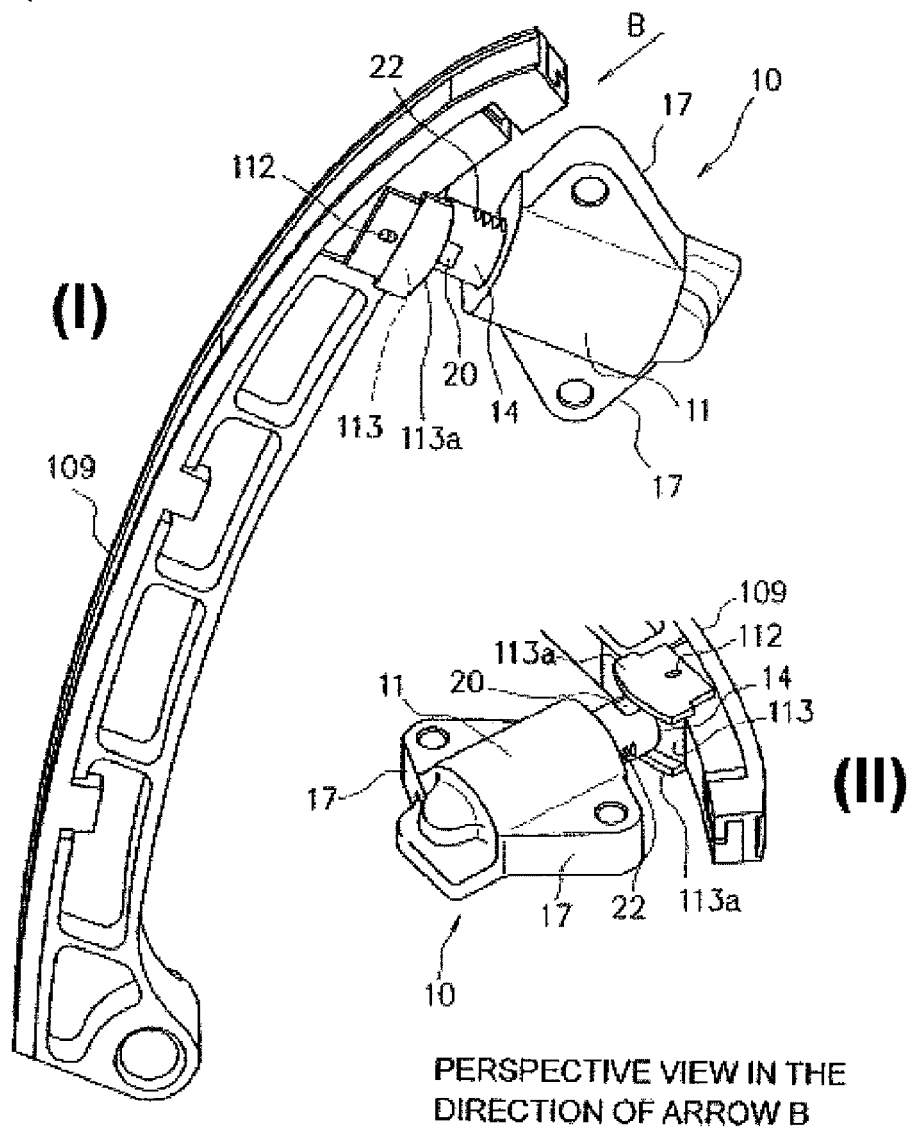
FIG. 7 is a perspective view illustrating an exemplary mounting of the chain tensioner according to the embodiment of the present invention.

Operations of the plunger 14 unlocked and acting as a tensioner will further be explained, referring to FIGS. 5A, 5B and FIG. 6. The chain tensioner 10 herein is mounted typically as illustrated in FIG. 7. The tensioner lever 109 is attached with a pad 113, with the aid of a pin 112, at a position corresponded to the plunger 14, so as to allow the plunger 14 to resiliently contact with the pad 113.

FIG. 5A illustrates a state of unlocking of the plunger 14, and FIG. 5B illustrates a state where the plunger 14 projects out from the cylinder 12 to as far as a maximum amount of projection. FIG. 6 illustrates operational states I to IV of the internal structure during the operation. Note that the upper drawings (illustrated in the circular windows) of FIG. 6 correspond to sections taken along line A-A in FIG. 3A. In the state I of FIG. 6, the engagement clip 19 escapes from the width-across-flats portions 20 and engages with the ratchet grooves 22b of the ratchets 22, as described in the above. The plunger 14 is pushed out with the aid of resilient force of the return spring 13, and projects out from the cylinder 12.

As the plunger 14 projects, the engagement clip 19 and the ratchets 22 slide relatively, and thereby the plunger 14 is pushed forward. In this process, the engagement clip 19 sequentially climbs over the ratchet ridges 22a and engages with the ratchet grooves 22b, and the correspondingly narrowed in the width (state II), or widened (state III) in the attachment groove 21.

Next, disassembling and assembling of the chain tensioner 10 will be explained.

FIG. 8A to 8D illustrate exemplary processes of disassembling the chain tensioner 10. In FIG. 8A, the plunger 14 is in a state of maximum projection out from the cylinder 12 (see state IV in FIG. 6). Since the engagement clip 19 engages with the rear endmost stopper grooves 24 of the ratchets 22, and thereby the plunger 14 is inhibited from slipping off, so that the chain tensioner 10 cannot be disassembled in this state.

When the plunger 14 is rotated, the engagement clip 19 gradually escapes from the stopper grooves 24, and climbs up onto the outer circumferential surface of the plunger 14 having a diameter larger than that of the stopper grooves 24. The engagement clip 19 is therefore widened as illustrated in FIG. 8B. In this example, by rotating the plunger 14 by approximately 90°, the plunger 14 may be pulled out from the cylinder 12 as illustrated in FIG. 8C, and may completely be drawn out from the housing 11 further as illustrated in FIG. 8.

Note that the chain tensioner 10 may be disassembled also by drawing out the engagement clip 19 from the attachment groove 21 to thereby draw out the cylinder 12, rather than rotating the plunger 14.

FIG. 9A to 9C illustrate processes of exemplary assembling of the chain tensioner 10. As illustrated in FIG. 9A, the plunger 14 is initially compressed in the cylinder 12 against the resilient force of the return spring 13. The plunger 14 in this state is rotated so that the width-across-flats portions 20 are positioned on both sides of the attachment groove 21.

While keeping the state, by inserting the engagement clip 19 into the attachment groove 21, and by allowing the straight portions of the engagement clip 19 to engage with the width-across-flats portions 20 as illustrated in FIG. 9B, the assembling may be completed. In this case, after the assembling, the engagement clip 19 and the width-across-flats portions 20 (steps 20a) engage with each other, and thereby the projective operations of the plunger 14 may be limited.

Next, a second embodiment of the chain tensioner of the present invention will be explained. FIGS. 10A, 10B and FIGS. 11A, 11B illustrate an example of the chain tensioner 10 according to the second embodiment. In this embodiment, the plunger 14 has a pair of width-across-flats portions 20 formed at the end thereof so as to be opposed with each other in the direction of diameter, similarly to as in the above-described embodiment. The plunger 14 has also ratchets 22 formed on portions of the outer circumferential surface thereof in the longitudinal direction.

Figure 10A:
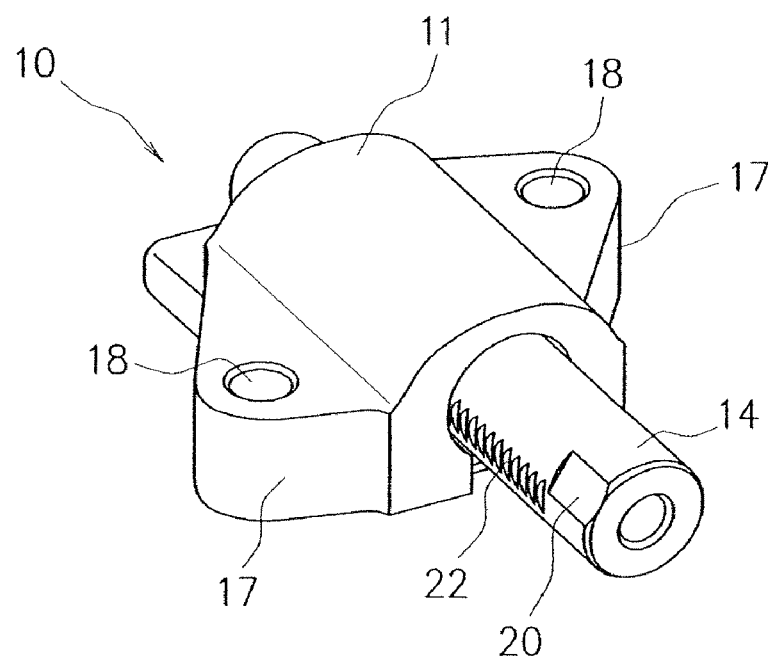
FIG. 10A is a perspective view illustrating a chain tensioner according to a second embodiment of the present invention.
Figure 10B:
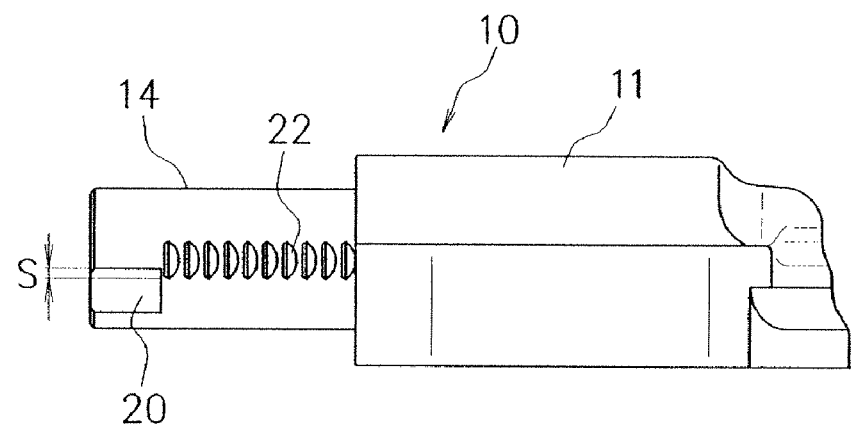
FIG. 10B is a side elevation illustrating the chain tensioner according to the second embodiment of the present invention.
Figure 11A:
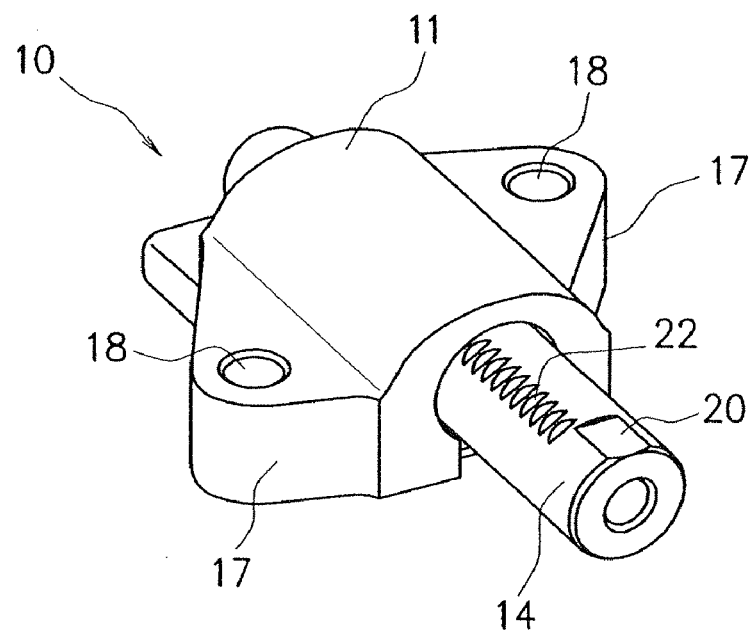
FIG. 11A is a perspective view illustrating the chain tensioner according to the second embodiment of the present invention.
Figure 11B:
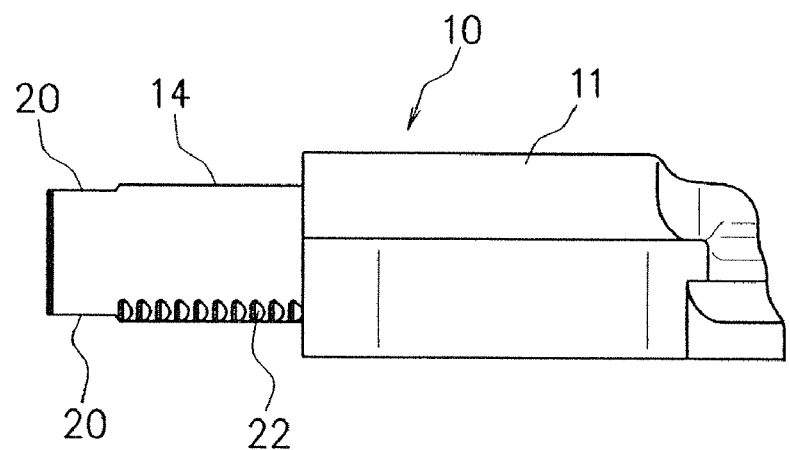
FIG. 11B is a side elevation illustrating the chain tensioner according to the second embodiment of the present invention.

In this embodiment, the width-across-flats portions 20 of the plunger 14 and the ratchets 22 are arranged so as to partially overlap with each other in the circumferential direction of the plunger 14. More specifically, as illustrated typically in FIGS. 10A, 10B, the width-across-flats portions 20 and the ratchets 22 are arranged so as to appropriately overlap at the end portions thereof in the circumferential direction with each other, when viewed in the circumferential direction. The amount of overlapping illustrated in FIG. 10B is defined as S.

The cylinder 12 has, at the opening thereof, the attachment groove 21 for the engagement clip 19, and the engagement clip 19 is housed in the attachment groove 21 in an expandable and shrinkable manner. The engagement clip 19 engages with the width-across-flats portions 20 or the ratchets 22 in the attachment grooves 21, substantially similarly to as in the above-described embodiment. Also other configurations are substantially similar to those in the above-described embodiment.

In the second embodiment of the present invention, first, the plunger 14 typically in the process of delivery is held in the cylinder 12 while being compressed therein. The plunger 14 is held at a position where the width-across-flats portions 20 thereof correspond to the straight portions of the engagement clip 19, and is locked in an compressed manner while bringing the steps 20a thereof into engagement.

When the chain tensioner 10 is made operable, the plunger 14 is rotated at the width-across-flats portions 20. When the plunger 14 rotates, the engagement clip 19 gradually escapes from the width-across-flats portions 20, and climbs up at the end (edge) of the width-across-flats portions 20 onto the outer circumferential surface of the plunger 14. A portion of each ratchet 22 in this state as viewed in the circumferential direction has already reached a position corresponded to the (straight portions of) the engagement clip 19, so that the engagement clip 19 engages with the ratchet grooves 22b of the ratchets 22 nearly at the same time with the complete escapement from the width-across-flats portions 20.

After being unlocked, the plunger 14 engages with the ratchet grooves 22b, and thereafter projects out from the cylinder 12 similarly to as in the above-described embodiment. In this embodiment, by virtue of the arrangement of the width-across-flats portions 20 of the plunger 14 and the ratchets 22 in a mutually and partially overlapped manner in the circumferential direction of the plunger 14, the engagement clip 19 may smoothly and exactly moves from the width-across-flats portions 20 to the ratchet grooves 22b.

Figure 12A:
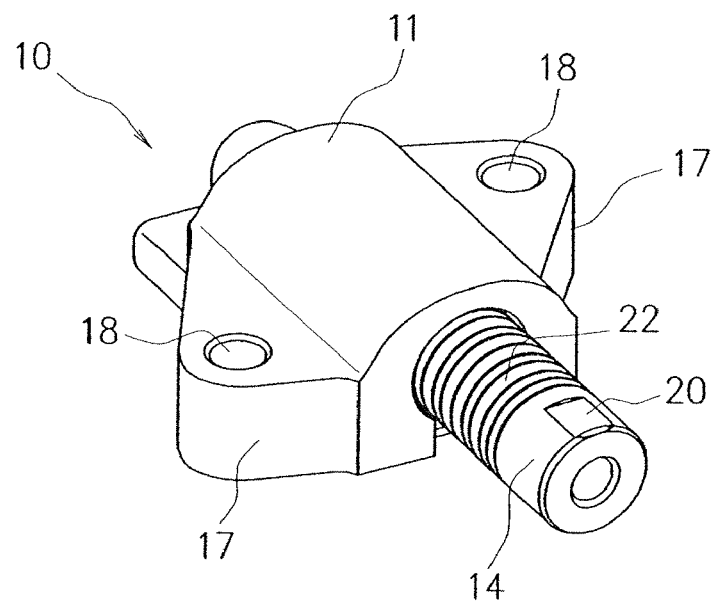
FIG. 12A is a perspective view illustrating a chain tensioner according to a third embodiment of the present invention.
Figure 12B:
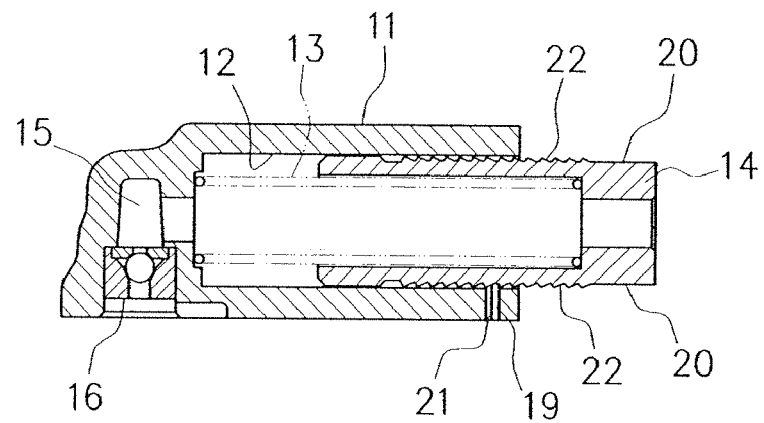
FIG. 12B is a sectional view illustrating the chain tensioner according to the third embodiment of the present invention.

Next, a chain tensioner according to a third embodiment of the present invention will be explained. FIGS. 12A, 12B illustrate an example of the chain tensioner 10 according to the third embodiment. In this embodiment, the plunger 14 has a pair of a width-across-flats portions 20 formed at the end thereof so as to be opposed with each other in the direction of diameter, similarly to as in the above-described embodiment.

In particular in this embodiment, the plunger 14 has the ratchet 22 over the entire circumferential surface thereof. The length of the ratchet 22 in the longitudinal direction may be the same as in the above-described embodiment, wherein each ratchet groove 22b is formed over the entire circumference as so-called circumferential groove.

The ratchet 22 has the stopper groove 24 at the rear endmost portion thereof. The side face 24a of the stopper groove 24 formed on the rear side thereof is given as a wall nearly vertical to the axial direction of the plunger 14. In this embodiment, the side face 24a is not provided at least at a portion in the entire circumference of the plunger 14. Alternatively, the side face 24a is formed at a portion thereof as an inclined surface which inclines moderately, rather than formed as a wall nearly vertical to the axial direction of the plunger 14. The portion where the side face 24a is not provided, or the inclined surface is provided, may be set typically to portions corresponded to the width-across-flats portions 20 in the circumferential direction of the plunger 14.

Also in the third embodiment, the cylinder 12 has, at the opening thereof, the attachment groove 21 for the engagement clip 19, and the engagement clip 19 is housed in the attachment groove 21 in an expandable and shrinkable manner. The engagement clip 19 engages with the width-across-flats portions 20 or the ratchet 22 in the attachment grooves 21, substantially similarly to as in the above-described embodiment. Also other configurations are substantially similar to those in the above-described embodiment.

In the third embodiment of the present invention, similarly to as in the above-described embodiment, the plunger 14 typically in the process of delivery is held in the cylinder 12 while being compressed therein. The plunger 14 is held at a position where the width-across-flats portions 20 thereof correspond to the straight portions of the engagement clip 19, and is kept locked in an compressed manner while bringing the steps 20a thereof into engagement.

When the chain tensioner 10 is made operable, the plunger 14 is rotated at the width-across-flats portions 20. When the plunger 14 rotates, the engagement clip 19 escapes from the width-across-flats portions 20, and at the same time engages with the ratchet groove 22b of the ratchet 22. Since the ratchet 22 herein is formed over the entire outer circumference of the plunger 14, so that the engagement clip 19 may smoothly and exactly moves from the width-across-flats portions 20 to the ratchet groove 22b.

The chain tensioner 10 may be disassembled by rotating the plunger 14 so as to correspond the engagement clip 19 to portions where the side face 24a of the stopper groove 24 is not provided, and by drawing the plunger 14 out from the cylinder 12.

Figure 13A:
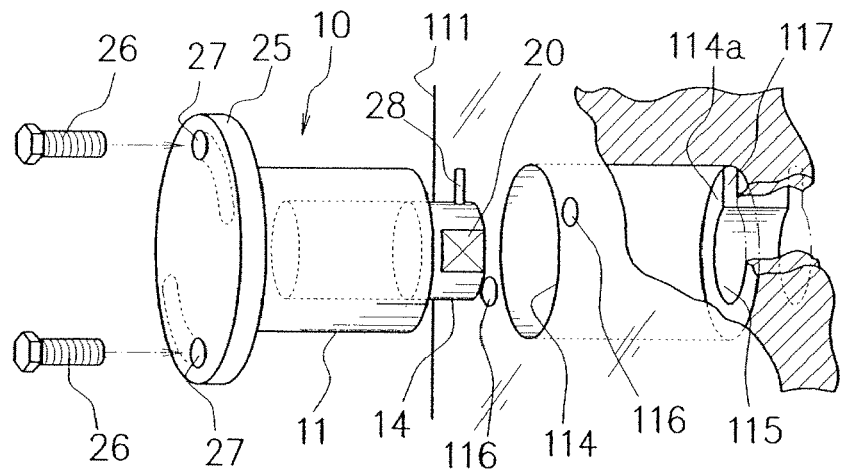
FIG. 13A is a drawing illustrating a process of attaching a chain tensioner according to a fourth embodiment of the present invention.
Figure 13B:
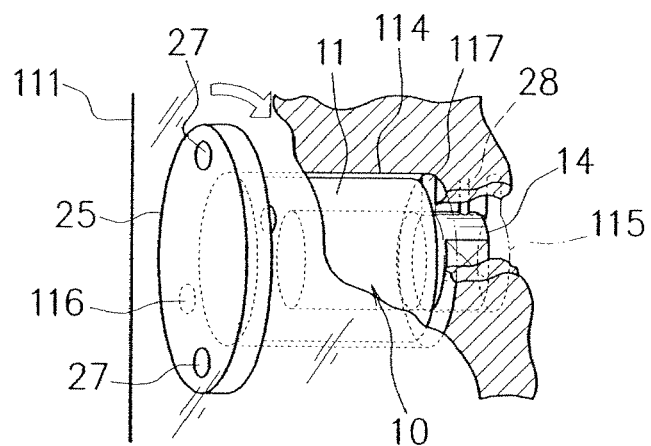
FIG. 13B is a drawing illustrating a process of attaching the chain tensioner according to the fourth embodiment of the present invention.
Figure 13C:
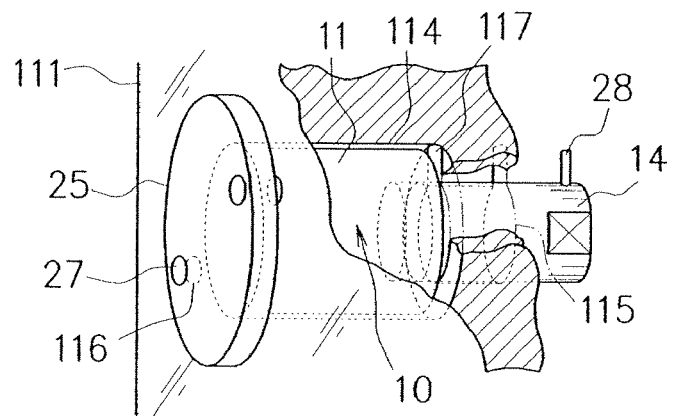
FIG. 13C is a drawing illustrating a process of attaching the chain tensioner according to the fourth embodiment of the present invention.

Next, a chain tensioner according to a fourth embodiment of the present invention will be explained. FIGS. 13A to 13C illustrate an example of the chain tensioner 10 according to the fourth embodiment. In this embodiment, the basic configuration of the chain tensioner 10 is almost similar to that in the above-described embodiment, wherein the engagement clip 19 is attached to the opening of the cylinder 12, and the width-across-flats portions 20 are provided to the end of the plunger 14 on the projection side thereof. The engagement clip 19 and the width-across-flats portions 20 are made engageable with, and disengageable from each other, corresponding to the position of rotation of the plunger 14.

In the fourth embodiment, as illustrated in FIG. 13A, there is formed a housing hole 114 for mounting the chain tensioner 10 in a predetermined portion of the cylinder block 111, so as to allow insertion and attachment of the chain tensioner 10 to the housing hole 114, from the external of the cylinder block 111.

The housing hole 114 in this embodiment has a circular section, and has a depth (length) enough for accommodate the housing 11. The housing 11 herein has a circular section, and is rotatable in the housing hole 114. In the portion beyond the bottom 114a of the housing hole 114 (inside the cylinder block 111), there is further formed a through-hole 115 having a diameter approximately equal to that of the plunger 14, allowing therein insertion of the plunger 14, and opened in the cylinder block 111.

The housing 11 is provided with a flange 25 on the rear end thereof, so as to allow attachment and fixation of the chain tensioner 10 at the flange 25. The flange 25 has through-holes 27 for fixation bolts 26 formed therein, on the other hand, the cylinder block 111 has screw holes 116 in which the fixation bolt 26 are screwed. In the process of attachment, the chain tensioner 10 is screwed and fixed with the aid of the fixation bolts 26 to a predetermined portion of the cylinder block 111. Note that the through-holes 27 may be oblong holes shaped along the circumferential direction of the flange 25, as indicated by the broken lines in FIG. 13A.

In this embodiment, there is further implanted a small pin 28 at the end of the plunger 14 on the circumference thereof. The small pin 28 projects nearly in the radial direction of the plunger 14, and on the other hand, a groove 117, allowing the small pin 28 to pass therethrough, is formed on the cylinder block 111 side, in a form of communicating with the through-hole 115. The groove 117 has a width appropriately larger than the diameter of the small pin 28, over the longitudinal direction of the plunger 14.

When the chain tensioner 10 is mounted to a predetermined portion of the cylinder block 111 in the fourth embodiment, the plunger 14 is held while being compressed in the cylinder 12. First, as illustrated in FIG. 13A, the housing 11 is inserted into the attachment hole 114 of the cylinder block 111. At the same time, the plunger 14 is inserted into the through-hole 115.

After the housing 11 is inserted, the small pin 28 stops at an intermediate position of the groove 117. The housing 11 is rotated as indicated by an arrow in FIG. 13B, making use of the flange. Since the small pin 28 herein is arranged inside the groove 117, and thereby the rotation thereof is limited by the groove 117, so that also the rotation of the plunger 14 per se is limited. The engagement clip 19 attached inside the housing 11 rotates relative to the width-across-flats portions 20 of the plunger 14, as the housing 11 rotates. In this way, similarly to as in the above-described embodiment, the engagement clip 19 escapes from the width-across-flats portions 20 and engages with the ratchets 22, and the plunger 14 may consequently be unlocked.

The plunger 14 then projects out from the housing 11 as illustrated in FIG. 13C, and thereby the chain tensioner 10 turns operable. The small pin 28 herein escapes from the groove 117, so that the both do not interfere with each other any more. Lastly, the through-holes 27 of the flange 25 are positionally aligned with the screw holes 116 of the cylinder block 111, and the chain tensioner 10 is fixed by tightening the fixation bolts 26, at a predetermined portion of the cylinder block 111.

According to the fourth embodiment, the chain tensioner 10 may be turned operable by a procedure, only as simple as rotating the housing 11, even from the external of the cylinder block 111. The chain tensioner 10 may therefore raise advantages of easy mounting, and excellent usability and handlability.

Now in this exemplary case where the chain tensioner 10 is inserted and attached to the cylinder block 111 from the external thereof, a pad 113 attached to the tensioner lever 109, as illustrated in FIG. 7, may be adoptable. More specifically, the pad 113 in this case has a pair of guide plates 113a having a width appropriately larger than that of the width-across-flats portions 20 of the plunger 14.

When the chain tensioner 10 is mounted to a predetermined portion of the cylinder block 111, the width-across-flats portions 20 are nipped from both sides thereof by the guide plate 113a as illustrated in FIG. 7, so as to limit rotation of the plunger 14. By rotating the housing 11 in a substantially similar manner as described in the above, the plunger 14 may be unlocked.

As has been explained referring to the embodiments, according to the chain tensioner 10 of the present invention, the plunger 14 is kept compressed typically in the process of delivery, and the width-across-flats portions 20 and the engagement clip 19 are made engageable with, and disenageable from each other, by a procedure only as simple as rotating the plunger 14 or the housing 11. The plunger 14 may be locked to prevent the projection thereof, or may be allowed to project, proving its excellent handlability.

The chain tensioner may be configured only by simply machining the plunger 14, may need only an extremely small number of components, and may therefore be simplified in the configuration. The chain tensioner may therefore be realized as a compact, and highly cost-competitive device.

The present invention is not limited to the above-describe embodiments, and instead allows any modifications within the scope of the present invention. For example, the plunger 14 explained in the above as an example of having the width-across-flats portions 20 may have a cut surface only on either side, so far as conditions of rigidity and so forth may be satisfied. In addition, the amount of shift between the width-across-flats portions 20 and the ratchets 22, explained as 90° in the first embodiment and so forth, may be variable.

The present invention allows also an embodiment such that the engagement clip 19 is combined only with the ratchets 22. More specifically, the basic configuration, in which a plunger is slidably fitted in a bottomed cylinder formed in a housing, and the plunger is resiliently urged by a spring in the direction along which the plunger is projected out from the cylinder, is the same with that in the above-described embodiments. The engagement clip 19 may be attached to the opening of the cylinder 12, and the ratchets 22 may be formed on the outer circumferential surface of the plunger 14 in the longitudinal direction thereof. The engagement clip 19 is then designed to engage with the ratchets 22.

Since the engagement clip 19 may be inserted laterally to the plunger 14, so that the motion of engagement between the engagement clip 19 and the ratchets 22 may be adoptable also to chain tensioners having no engagement portion (width-across-flats portions 20).

Industrial Applicability

As has been described in the above, according to the present invention, the engagement clip and the engagement portions are made engageable with, and disenageable from each other corresponding to the position of rotation of the plunger, so that the plunger may appropriately be locked and unlocked by a simple rotating operation of the plunger. The chain tensioner is extremely excellent in the handlability, may be configured only by simply machining the plunger, may need only an extremely small number of components, and may therefore be simplified in the configuration. The present invention may therefore provide a compact, and highly cost-competitive chain tensioner device.

What is claimed is:

1. A chain tensioner having a plunger slidably fitted in a bottomed cylinder formed in a housing, and configured to resiliently urge the plunger by a spring in the direction along which the plunger is projected out from the cylinder, the chain tensioner being configured to attach an engagement clip to the opening of the cylinder, and to provide an engagement portion engageable with the engagement clip to the end of the plunger on the projection side thereof, so as to allow the engagement clip and the engagement portion to engage with and disengage from each other corresponding to the position of rotation of the plunger, wherein the plunger has a ratchet formed on the outer circumferential surface thereof in the longitudinal direction, so as to allow the engagement clip, released from the engagement portion as the plunger rotates, to engage with the ratchet.

2. The chain tensioner according to claim 1, wherein the cylinder has an attachment groove for the engagement clip at the opening thereof, and the engagement clip is housed in the attachment groove in an expandable and shrinkable manner.

3. The chain tensioner according to claim 1, wherein the engagement portion has a pair of the notched surfaces at positions opposed in the direction of diameter of the plunger.

4. The chain tensioner according to claim 1, wherein, when the engagement clip and the ratchet come into engagement, the engagement clip is widened by a ratchet ridge of the ratchet so as to allow the plunger to project, and is engaged with a ratchet groove of the ratchet so as to limit regression of the plunger.

5. The chain tensioner according to claim 1, wherein the ratchet is formed to the plunger over a portion in the outer circumferential direction thereof, and is arranged so as to bring the engagement portion of the plunger and the ratchet apart from, or to partially overlap with each other, in the outer circumferential direction of the plunger.

6. The chain tensioner according to claim 1, wherein the engagement portion is formed by notching a portion of the outer circumferential surface of the plunger, so as to allow the engagement clip to engage on the notched surface thereof, to thereby allow the plunger to rotate.

* * * * *